United States Patent
Lewis

(10) Patent No.: US 9,232,771 B2
(45) Date of Patent: Jan. 12, 2016

(54) SECONDARY RESTRAINT ASSEMBLY

(71) Applicant: Forrest R Lewis, Miamisburg, OH (US)

(72) Inventor: Forrest R Lewis, Miamisburg, OH (US)

( * ) Notice: Subject to any disclaimer, the term of this patent is extended or adjusted under 35 U.S.C. 154(b) by 224 days.

(21) Appl. No.: 14/181,976

(22) Filed: Feb. 17, 2014

(65) Prior Publication Data

US 2014/0238311 A1     Aug. 28, 2014

Related U.S. Application Data

(60) Provisional application No. 61/770,038, filed on Feb. 27, 2013.

(51) Int. Cl.
*A01K 27/00* (2006.01)

(52) U.S. Cl.
CPC ............. *A01K 27/002* (2013.01); *A01K 27/003* (2013.01); *A01K 27/005* (2013.01)

(58) Field of Classification Search
CPC .......... A61F 2002/7862; A61F 623/65; A01K 27/002; A01K 27/003; A01K 27/005
USPC ................. 224/222, 267, 219, 220, 661, 254; 623/65, 58, 60, 62, 63, 57; 2/44, 45
See application file for complete search history.

(56) References Cited

U.S. PATENT DOCUMENTS

| | | | | |
|---|---|---|---|---|
| 3,897,785 A * | 8/1975 | Barto, Jr. | ............. | A61F 5/4408 604/327 |
| 4,198,989 A * | 4/1980 | Hawke | ................. | A61M 25/02 128/877 |
| 5,806,466 A * | 9/1998 | Pintor | ................... | A01K 27/00 119/770 |
| 7,517,340 B2 * | 4/2009 | Barrientos | ................ | A61F 5/44 128/876 |
| 8,196,787 B2 * | 6/2012 | Strandberg | ................ | A45F 5/00 2/16 |
| 2004/0182896 A1 * | 9/2004 | Ballard | ...................... | A45F 3/14 224/222 |
| 2006/0180095 A1 * | 8/2006 | Burton | ................... | A01K 15/02 119/770 |
| 2010/0145474 A1 * | 6/2010 | Duncan | ..................... | A61F 4/00 623/57 |
| 2011/0290845 A1 * | 12/2011 | Jackson | ................. | A01K 97/10 224/661 |

* cited by examiner

*Primary Examiner* — Brian M O'Hara
*Assistant Examiner* — Morgan T Barlow

(57) ABSTRACT

A secondary restraint assembly is provided as a means on maintaining control of a leash in the event of a sudden pull or movement to said leash. The secondary restraint assembly accomplishes this by being attached to a user's forearm and unobtrusively engaging the leash. The secondary restraint assembly utilizes a harness assembly to attach to the user's forearm. The harness assembly utilizes adjustable straps to secure itself to the forearm and serves as a mounting point for a harness plate. The harness plate contains an insert coupler that joins an insert plate to the harness assembly. The user couples an extended strap to the insert plate and joins the other end to the leash. With the leash secured to the extended strap, and the extended strap secured to the harness assembly through the insert plate, the secondary restraint assembly enables a user to maintain control of said leash.

9 Claims, 10 Drawing Sheets

SECONDARY RESTRAINT ASSEMBLY

The current application claims a priority to the U.S. Provisional Patent application Ser. No. 61/770,038 filed on Feb. 27, 2013.

FIELD OF THE INVENTION

The present invention relates generally to pet leashes. More specifically, the present invention is a pet leash safety apparatus which is worn by a user. The present invention is secured to the user and secured to the pet leash. This ensures that the pet leash is inseparable from the user. This prevents the pet from escaping the user's control and potentially being injured or injuring other animals or people. The present invention also features the ability to quickly release the leash at the command of the user; this is important as the leash may need to be released quickly if the animal overcomes the strength of the user and may injure the user if the leash is not released.

BACKGROUND OF THE INVENTION

Throughout history, humans have domesticated animals to serve many different purposes ranging from work animals to pets. Pet animals serve as companions to their human owners, providing important emotional exchange for their owners. The emotional support offered by pet animals helps to prevent their owners from becoming lonely or depressed, even if that owner is lacking in social interaction with other humans. There is a wide range of different animals which have been domesticated for service as pets. The two most common pets in the United States are cats and dogs. Cats are very solitary creatures for the most part. They enjoy attention and being petted and rubbed, however cats spend much of the day relaxing in a secluded area of the owner's house, often near a heat source. Dogs on the other hand are very active pets. They enjoy being near their owners as much as possible and they are very excitable. Most dogs thoroughly enjoy any kind of physical activity and need regular exercise in order for them to stay as healthy as possible. Dogs also enjoy being outdoors where their noses can capture and analyze a myriad of different smells. Because of these facts, most owners walk their dogs on a fairly regular basis.

The act of walking a dog usually involves the owner attaching a leash to the dog's collar and then walking along sidewalks or in a park. Most outdoor areas require the dog to be on a leash, ensuring that the dog is under the control of the owner. If the dog were to escape the owner, the dog may be in danger of becoming injured or may be a danger to people or other animals if the dog is aggressive. There are many different kinds of leashes which enable the owner to comfortably control the dog. However, even when the dog is on a leash, they can still escape sometimes. If the dog is very large it may be able to jerk the leash out of the owner's hand. Furthermore, if the owner holding the leash is distracted, perhaps in conversation with another dog owner, and the dog jerks suddenly, the leash may slip out of the owner's hand. In such a situation, the owner has lost control of the animal, and the animal is at a much higher risk of becoming injured, lost, or injuring others. All current leashes available on the market suffer from this issue, as it is more of an operator issue that a design issue. However, it is possible to solve the issue by introducing a secondary failsafe which would physically secure the leash to the owner.

It is an object of the present invention to introduce an apparatus which physically attaches the leash to the owner such that even if the owner drops the leash or the leash slips out of the owner's hand, the owner will not lose control of the animal. It is a further object of the present invention to ensure that the connection between the leash and the owner may be severed at a moment's notice should an emergency situation arise in which the owner may be injured if they remain attached to the leash. The present invention is designed to be attached to a human forearm, which allows the owner to bear the force of the dog pulling on the leash using their muscles as opposed to having that force exerted directly on the owner's joints. The present invention is usable not only with dogs but with any other animal that is walked on a leash such as trained cat. Although a cat may not be able to exert as much force to potentially jerk a leash out of the owner's hand, a cat would be much harder to recapture than a dog as most cats do not respond to vocal commands form their owners. Considering this fact, the present invention may be equally as useful for walking a cat or other small animals, ensuring that the owner does not accidentally lose the animal.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
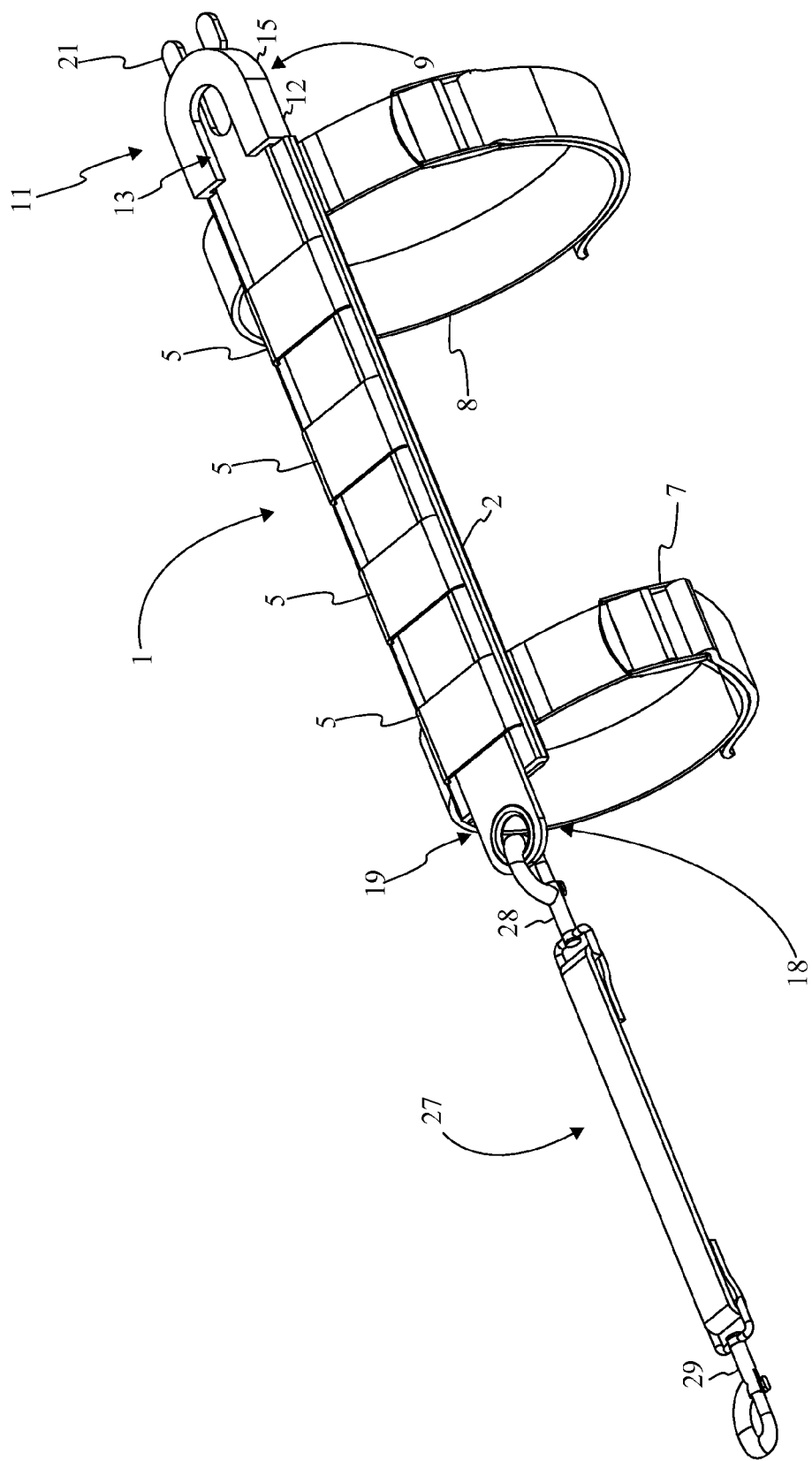
FIG. 1 is a perspective view displaying the secondary restraint assembly as per the current embodiment of the present invention.
Figure 2:
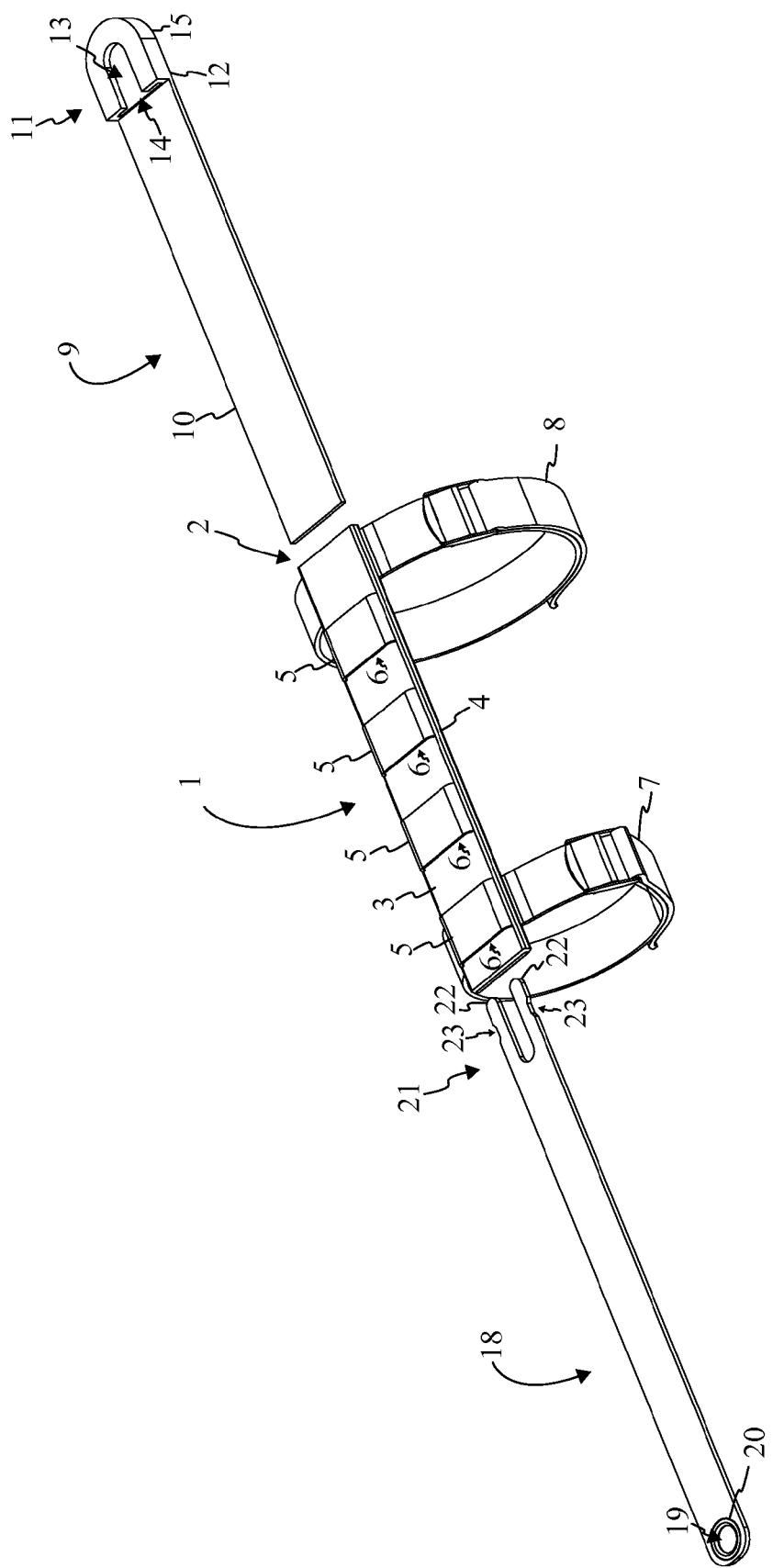
FIG. 2 is an expanded perspective view displaying the alignment of the insert plate, the harness plate, and the harness assembly as per the current embodiment of the present invention.
Figure 3:
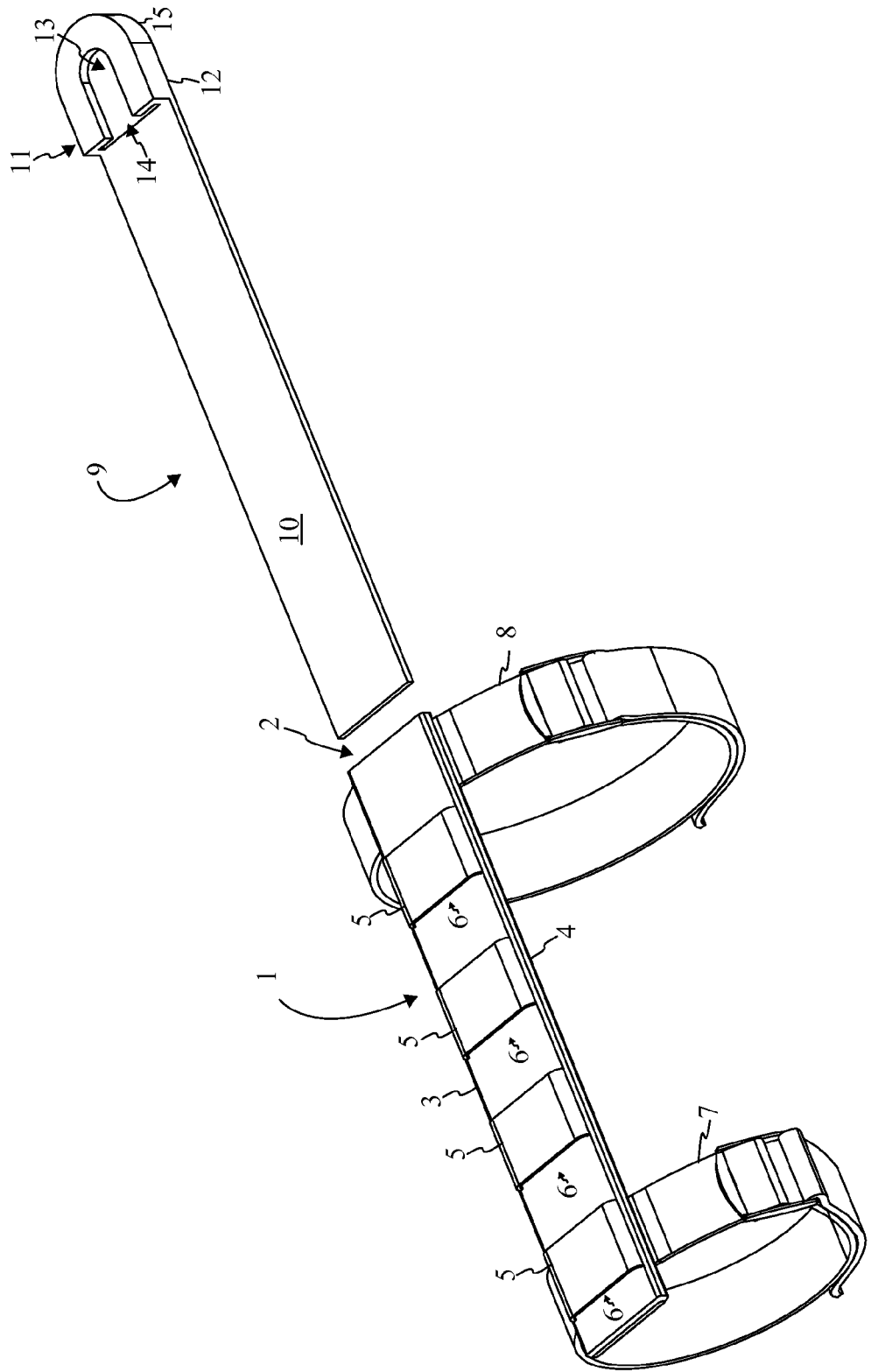
FIG. 3 is an expanded perspective view displaying the installation alignment of the harness plate with the harness assembly as per the current embodiment of the present invention.
Figure 10:
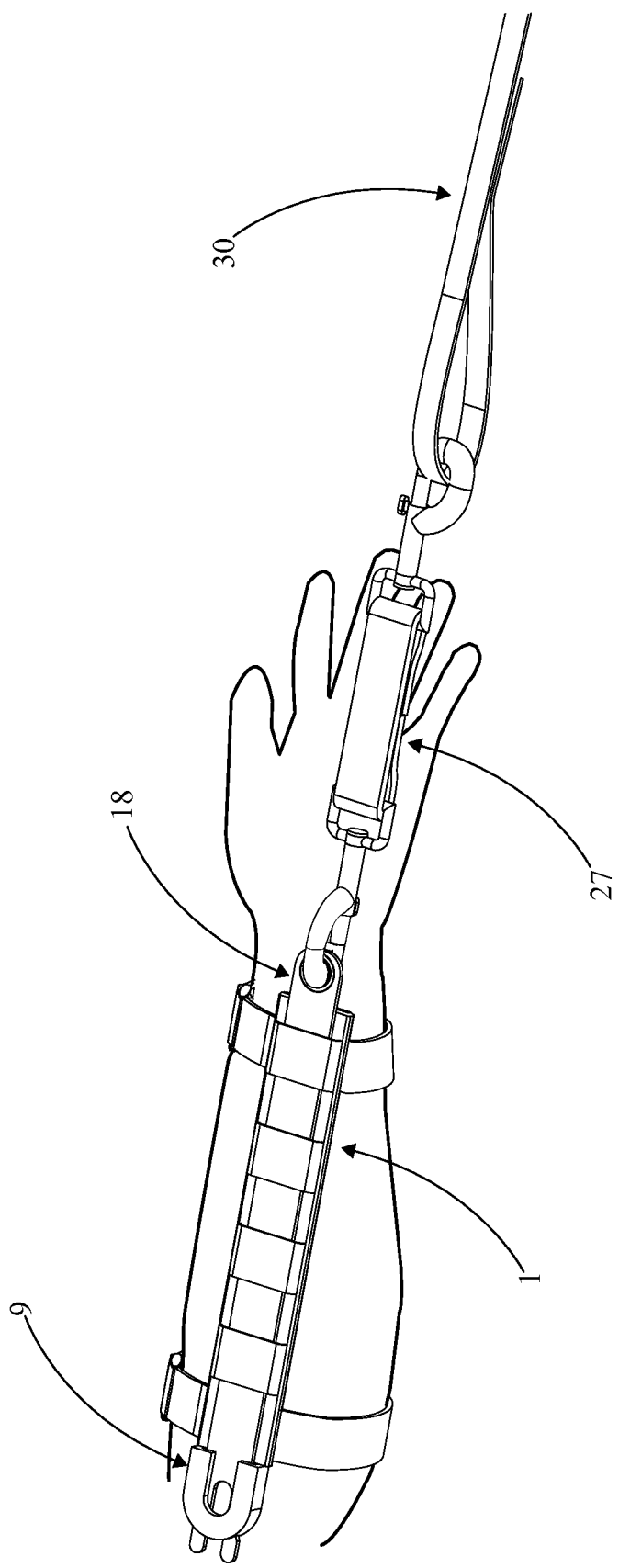
FIG. 10 is a perspective view displaying the secondary restraint assembly mounted to a user's arm with an attached leash as per the current embodiment of the present invention.

Referencing FIG. 1, FIG. 2, and FIG. 10, the present invention is a secondary restraint assembly that attaches to a user's forearm and unobtrusively engages a leash 30 manipulated by the user. The secondary restraint assembly enables a user to maintain control of a leash 30 in the event of a sudden pull or movement resulting in the user losing their grip on the leash 30. The secondary restraint assembly reduces potential joint injuries to the wrist by being coupled the user's forearm. In the current embodiment of the present invention, the secondary restraint assembly comprises a harness assembly 1, a harness plate 9, an insert plate 18, and an extended strap 27. The harness assembly 1 is as an interfacing structure that adjustably attaches to a user's forearm. The harness plate 9 is an elongated structure partially mounted within the harness assembly 1. The insert plate 18 is an elongated structure detachably mounted to the harness plate 9 and the harness assembly 1. The extended strap 27 is a flexible member that unobtrusively couples a leash 30 with the secondary restraint assembly.

Referencing FIG. 1-5, the harness assembly 1 is secureably mounted to a user's forearm. The harness assembly 1 provides particular engagements for the harness plate 9 and the insert plate 18. The harness assembly 1 particularly positions the harness plate 9 in operative alignment with the insert plate 18. In the current embodiment of the present invention, the harness assembly 1 comprises a sleeve 2, an upper surface 3, a lower surface 4, a plurality of guide loops 5, a first adjustable strap 7, and a second adjustable strap 8. The sleeve 2 is an interior section of the harness assembly 1 that provides a particular mounting point for the harness plate 9. The upper surface 3 is coincident with the plurality of guide loops 5 and the insert plate 18. The lower surface 4 is coincident with the first adjustable strap 7, the second adjustable strap 8, and a user's forearm. The plurality of guide loops 5 are traversable features that align the insert plate 18 with the harness plate 9. The first adjustable strap 7 and the second adjustable strap 8 are fasteners that secure the harness assembly 1 to a user's forearm.

Figure 4:
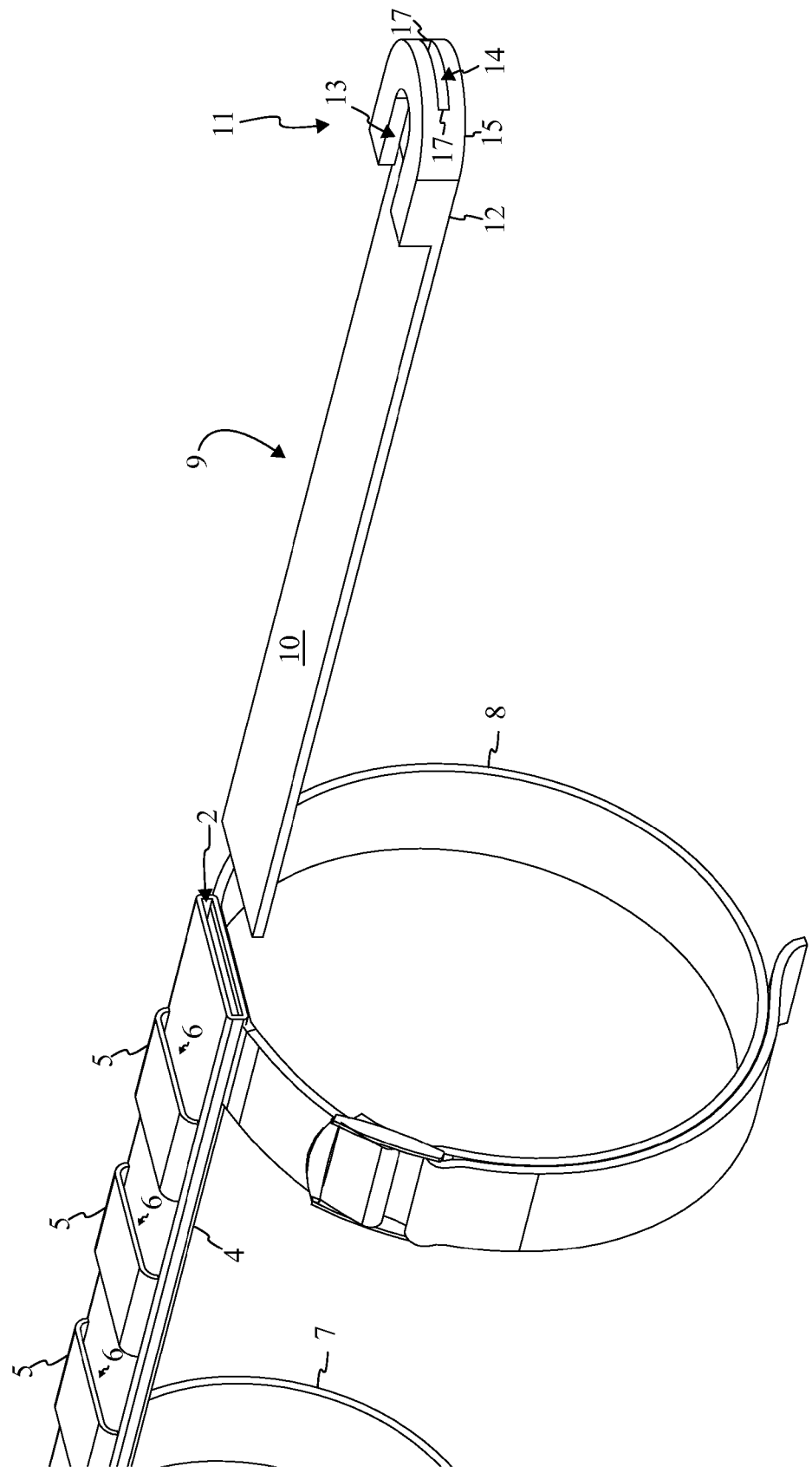
FIG. 4 is an expanded rear perspective view displaying the engagement between the sleeve and the elongated body as per the current embodiment of the present invention.

Referencing FIG. 1, FIG. 2, and FIG. 4, the sleeve 2 is a pocket that serves as a mounting point for the harness plate 9. The sleeve 2 secures the harness plate 9 with the harness assembly 1. The sleeve 2 is particularly formed to accept the harness plate 9, wherein the sleeve 2 partially surrounds the harness plate 9 partially conforming to the shape. The harness plate 9 traverses into the sleeve 2 adjacent to the second adjustable strap 8. The sleeve 2 is positioned between the upper surface 3 and the lower surface 4. The positioning of the sleeve 2 between the upper surface 3 and the lower surface 4 positions the harness plate 9 in alignment with the insert plate 18. The particular positioning of the sleeve 2 enables the harness plate 9 to reinforce the rigidity of the harness assembly 1 improving the retention against a user's forearm.

Referencing FIG. 1-5, the upper surface 3 is a region of the harness assembly 1 that is coincident with insert plate 18. The upper surface 3 is a generally planar area that extends the length of the harness assembly 1, wherein the length of the harness assembly 1 is measured between the positioning of the first adjustable strap 7 and the second adjustable strap 8. The upper surface 3 is positioned opposite the lower surface 4 across the sleeve 2. The upper surface 3 is secureably and operatively coupled with the plurality guide loops 5. The secure engagement of the upper surface 3 with the plurality guide loops 5 ensures retention of the insert plate 18 against the upper surface 3 under applied stress. The plurality of guide loops 5 are evenly distributed on the upper surface 3 improving contact with the insert plate 18. The plurality of guide loops 5 are centrally aligned on the along the length of the upper surface 3. The central alignment facilitates the traversal of the insert plate 18 across the upper surface 3 and positions the insert plate 18 coincident with the harness plate 9.

Referencing FIG. 1-5, the lower surface 4 is a region of the harness assembly 1 that is coincident with a user's posterior forearm. The lower surface 4 is a generally planar area that extends the length of the harness assembly 1, wherein the length of the harness assembly 1 is measured between the positioning of the first adjustable strap 7 and the second adjustable strap 8. The lower surface 4 is positioned opposite the upper surface 3 across the sleeve 2. The first adjustable strap 7 and the second adjustable strap 8 are secureably mounted to the lower surface 4. The first adjustable strap 7 is positioned apart from the second adjustable strap 8 along the length of the lower surface 4. The positioning distributes the first adjustable strap 7 and the second adjustable strap 8 to coincide with a user's distal region and proximal region of their forearm respectively.

Referencing FIG. 1-5, the plurality of guide loops 5 are evenly distributed features that operatively engage the insert plate 18. The plurality of guide loops 5 are found securely engaged to the upper surface 3. The secure engagement ensures the plurality of guide loops 5 are able to retain the insert plate 18 to the upper surface 3 under stress from a pull or sudden tug of a retained leash 30. The each guide loop 5 of the plurality of guide loops 5 is centrally aligned along the length of the upper surface 3. In the current embodiment of the present invention each guide loop 5 of the plurality of guide loops 5 comprises a guide opening 6. The guide openings 6 are a space found between a guide loop 5 and the upper surface 3. The guide openings 6 of the plurality of guide loops 5 are coincident with the insert plate 18. The guide openings 6 of the plurality of guide loops 5 utilize the central alignment to form a traversal path for the insert plate 18 that ensures a coincident engagement with the harness plate 9.

Referencing FIG. 1, FIG. 2, and FIG. 10, the first adjustable strap 7 and the second adjustable strap 8 are secureable means of retaining the harness assembly 1 and subsequently the secondary retention assembly to a user's forearm. Both the first adjustable strap 7 and the second adjustable strap 8 are found secureably mounted to the lower surface 4. The first adjustable strap 7 is positioned apart from the second adjustable strap 8 as their distribution is permits coincident engagements with the distal regions and proximal regions of a user's forearm, respectively. In the current embodiment of the present invention, the second adjustable strap 8 is longer than the first adjustable strap 7. In order to ensure proper positioning and adequate fitment with a user's forearm, the second adjustable strap 8 is provided with a strap length that is relatively longer than the strap length of the first adjustable strap 7. The second adjustable strap 8 is provided with sufficient length to wrap around the proximal region of a user's forearm. The proximal region of a user's forearm is the area of a user's forearm closest to the elbow and is commonly referred to as the upper forearm. This region is generally larger than the distal region coincident with the first adjustable strap 7, wherein the distal region is the area closet to the user's wrist.

Referencing FIG. 1-2 and FIGS. 4-6, the harness plate 9 is mounted within the harness assembly 1 by way of the sleeve 2. The harness plate 9 provides structural support to the harness assembly 1. The harness plate 9 detachably secures the insert plate 18 with the harness assembly 1. In the current embodiment of the present invention the harness plate 9 comprises an elongated body 10 and an insert coupler 11. The elongated body 10 is a long planar section that functions as the mounting point between the harness plate 9 and the harness assembly 1. The insert coupler 11 is a component located immediately adjacent to the elongated body 10 and positioned outside of the sleeve 2 when the elongated body 10 is mounted to with the harness assembly 1. The insert coupler 11 is provided as the attachment means between the insert plate 18 and the harness plate 9.

Figure 5:
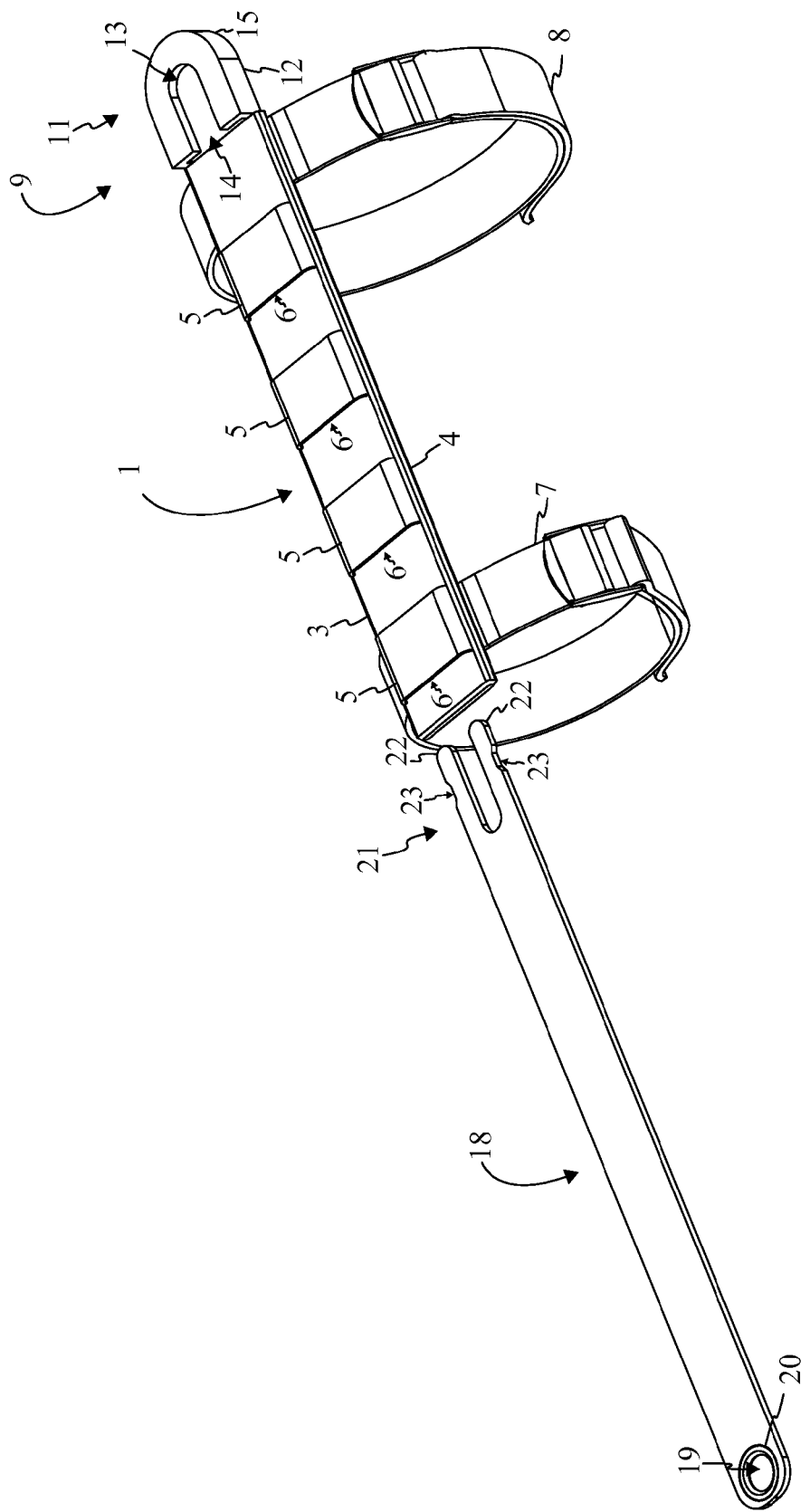
FIG. 5 is an expanded perspective view displaying the installation alignment between the insert plate and the harness assembly as per the current embodiment of the present invention.
Figure 6:
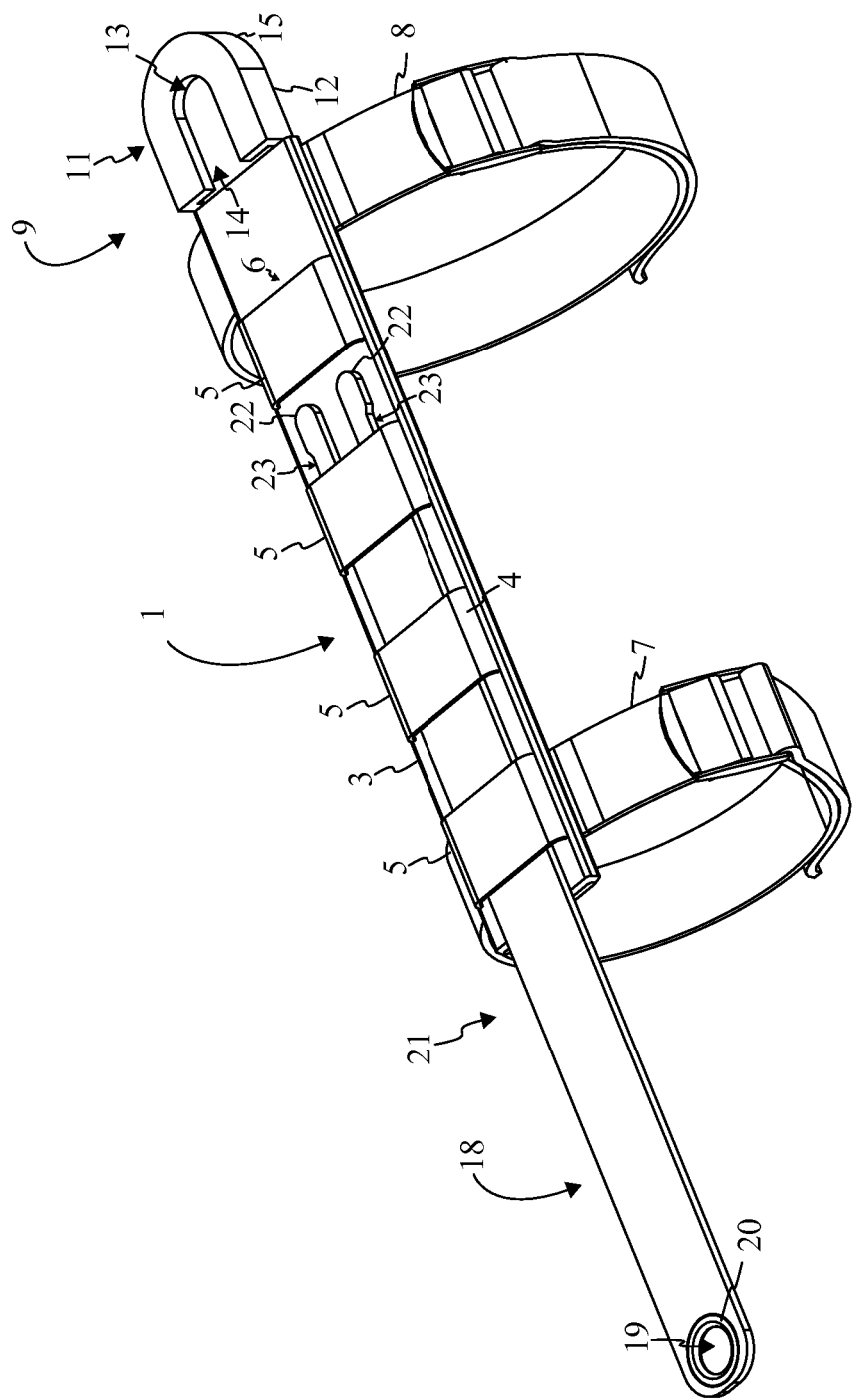
FIG. 6 is an expanded perspective view displaying the installation of the insert plate with the harness assembly as per the current embodiment of the present invention.
Figure 7:
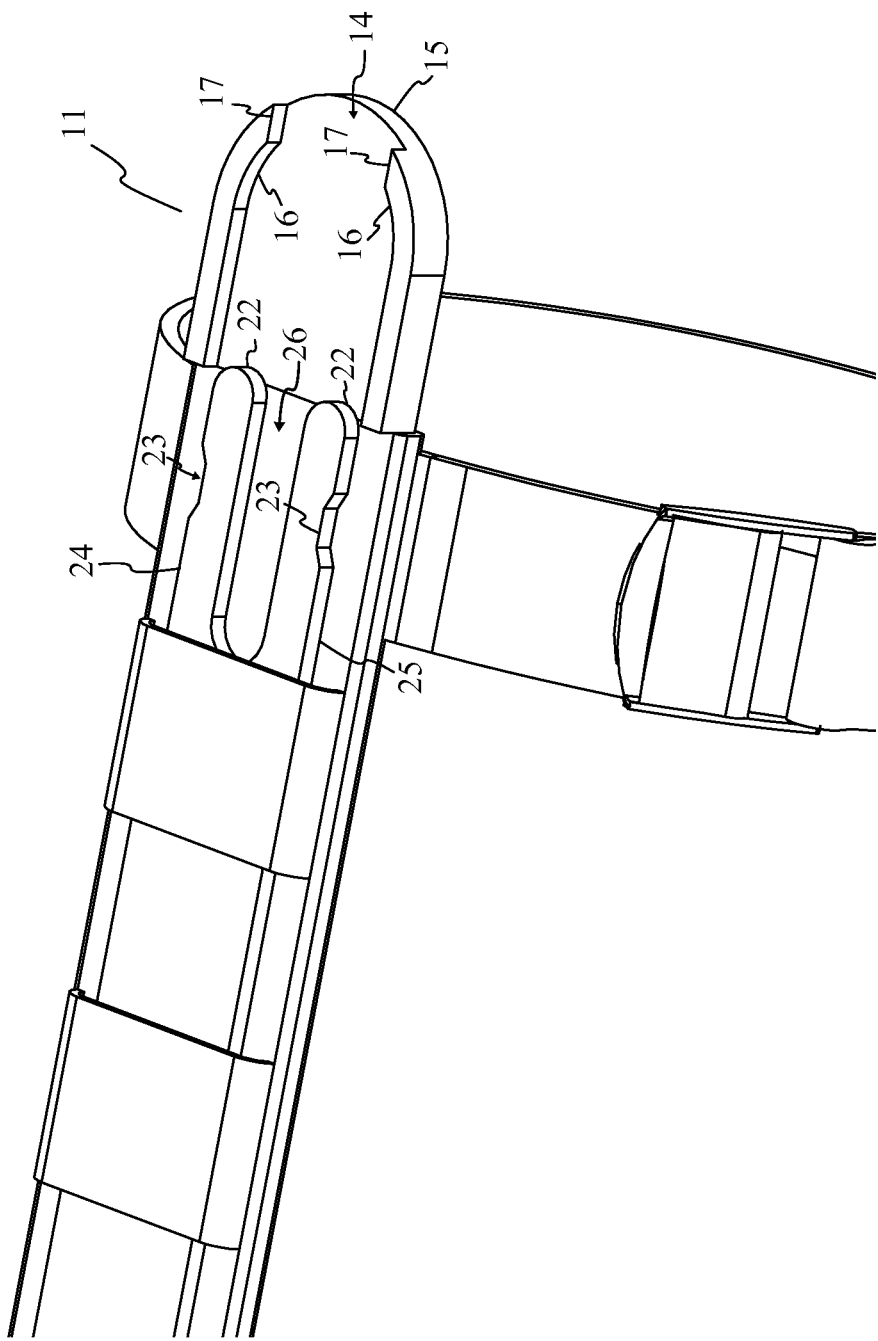
FIG. 7 is an enhanced perspective view displaying the alignment of the first prong and second prong of the at least two prong with the insert coupler as per the current embodiment of the present invention.
Figure 8:
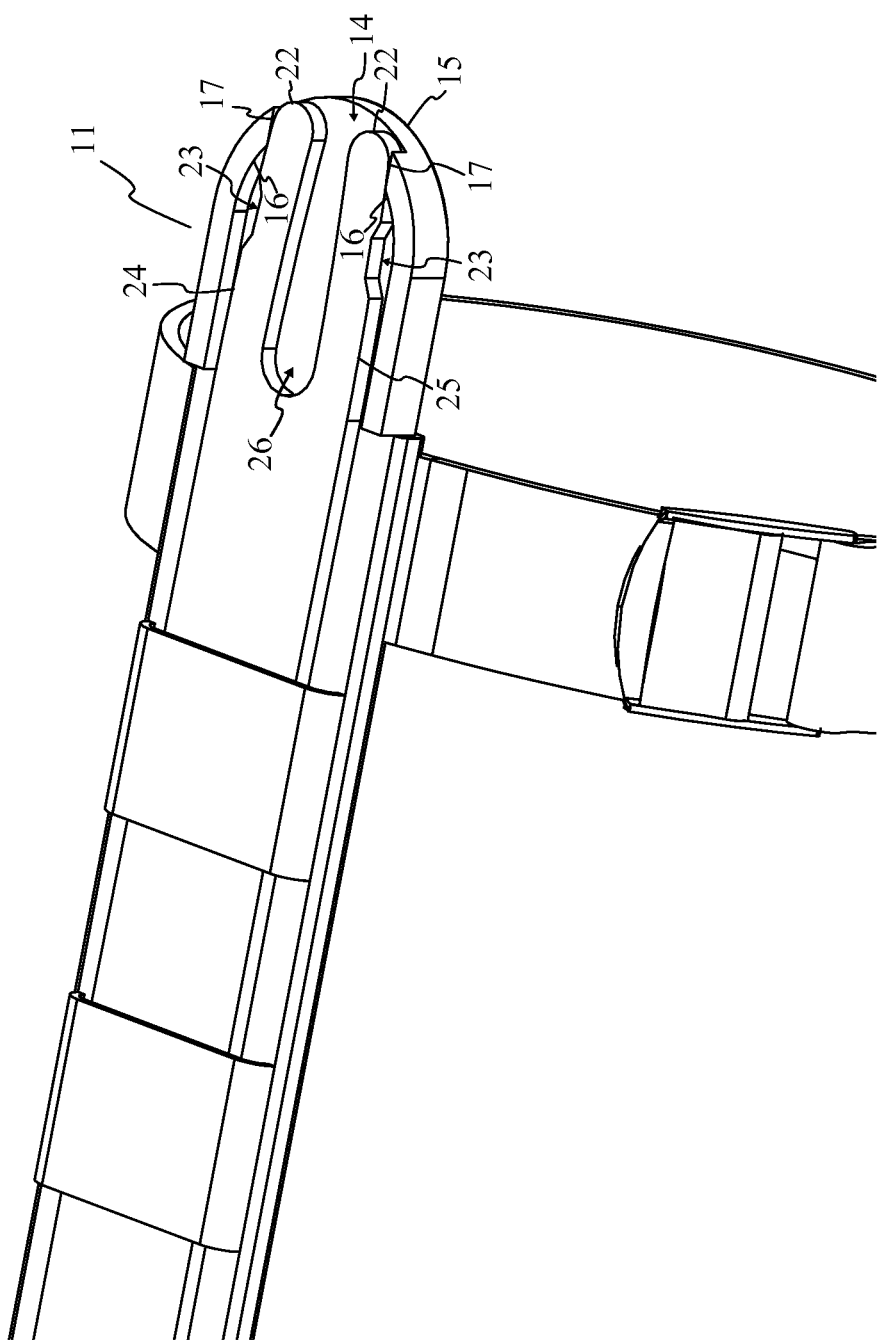
FIG. 8 is an enhanced perspective view displaying the engagement of the first prong and second prong of the at least two prong with the interior curvatures of the rounded section as per the current embodiment of the present invention.
Figure 9:
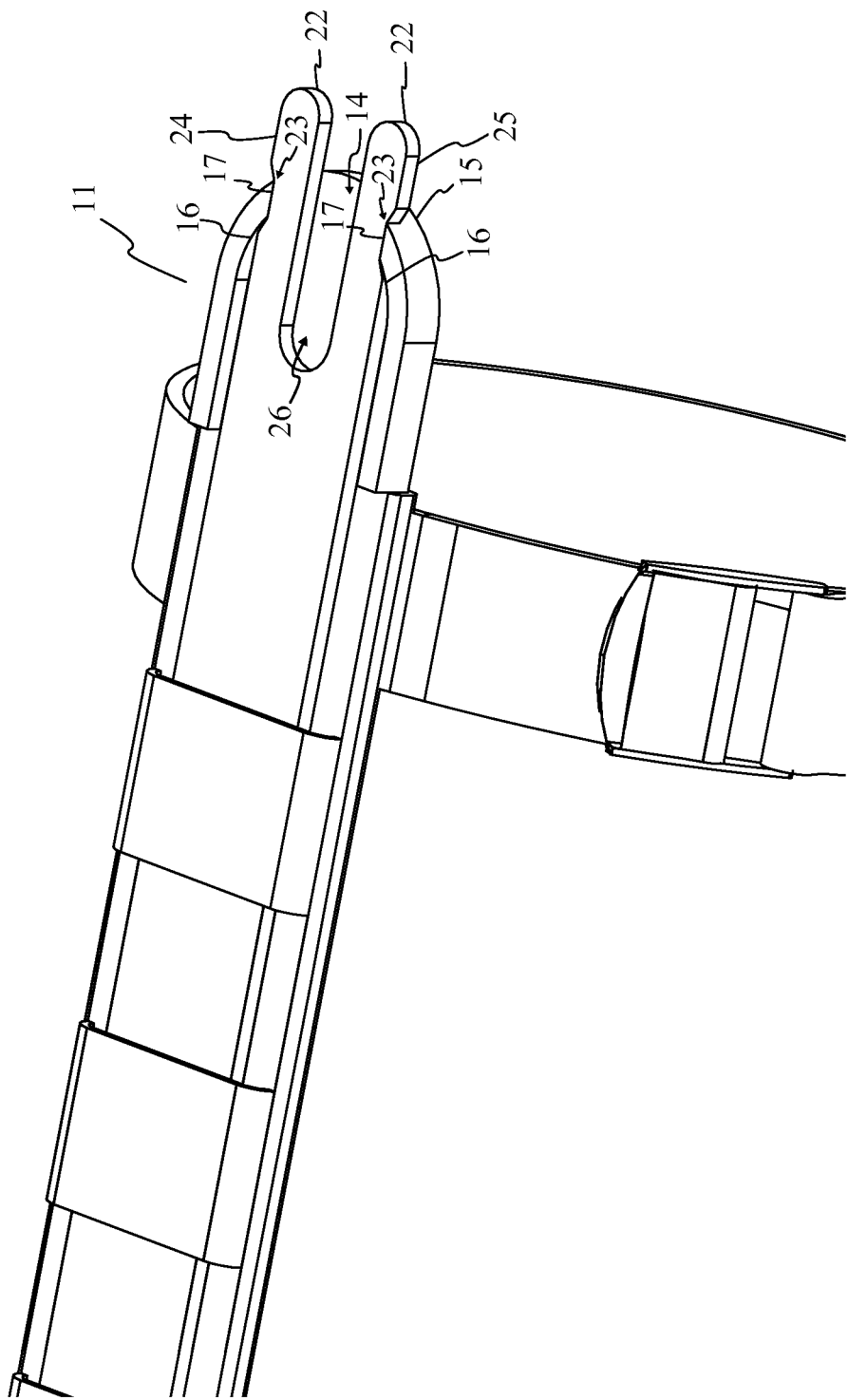
FIG. 9 is an enhanced perspective view displaying the engagement of the first prong and second prong of the at least two prong with the at least two mounts as per the current embodiment of the present invention.

Referencing FIGS. 4-6, the elongated body 10 is a long mostly rigid structural feature that engages the harness assembly 1 by way of the sleeve 2. The elongated body 10 is positioned immediately adjacent to the insert coupler 11. The elongated body 10 is positioned parallel with the insert plate 18 and subsequently parallel to the upper surface 3 and the lower surface 4. The elongated body 10 traverses into the sleeve 2 through an opening positioned adjacent to the second adjustable strap 8. The entire length of the elongated body 10 is shrouded by the sleeve 2. The elongated body 10 is securely retained within the sleeve 2 when tension is applied to the insert plate 18 by way of the leash 30. The elongated body 10 is restricted to longitudinal movement within the sleeve 2, wherein longitudinal movement is observed during the mounting of the elongated body 10 within the sleeve 2.

Referencing FIGS. 1-4 and FIGS. 6-9, the insert coupler 11 detachably engages the insert plate 18 with the harness plate 9. The insert coupler 11 is positioned immediately adjacent with the elongated body 10. The insert coupler 11 is found positioned outside of the sleeve 2 adjacent to the second adjustable strap 8. The insert coupler 11 is operatively aligned with the guide opening 6 of the plurality of guide loops 5. In the current embodiment of the present invention, the insert coupler 11 comprises a housing 12, a cavity 13, an insert opening 14, a rounded section, and at least two insert mounts 17. The housing 12 is provided as the structural exterior of the insert coupler 11. The cavity 13 is an excised portion of the housing 12 that is coincident with the insert opening 14. The insert opening 14 is a passage that enables the insert plate 18 to traverse into the housing 12 in order to become coincident with the at least two insert mounts 17. The rounded section 15 is a portion of the housing 12 provided as a means of facilitating the secure engagement of the insert plate 18 with the at least two insert mounts 17. The at least two insert mounts 17 are the engagement points provided for the insert plate 18.

Referencing FIGS. 1-4 and FIGS. 6-9, the housing 12 is the structural exterior of the insert coupler 11. The housing 12 is positioned adjacent with the elongated body 10. The housing 12 is operatively aligned with the insert plate 18 as the housing 12 encloses the insert opening 14 and the at least two insert mounts 17. The housing 12 is traversed by the insert opening 14 and the cavity 13. The insert opening 14 traverses through the entirety of the housing 12, wherein the insert opening 14 continues an alignment path set by the guide openings 6 of the plurality of guide loops 5. The cavity 13 traverses through the upper portion of the housing 12 becoming coincident with the insert opening 14. The rounded section 15 is positioned immediately adjacent to the housing 12 opposite the positioning of the elongated body 10.

Referencing FIGS. 1-4 and FIGS. 6-9, the cavity 13 is provided as an opening through the housing 12 that is coincident with the insert opening 14. The cavity 13 is positioned on the upper portion of the housing 12. The cavity 13 is partially positioned through the rounded section 15 resulting in a slight concavity 13 being formed coincident with the upper portion of the rounded section. The cavity 13 provides viewing of the interior of the housing 12, more specifically viewing of the insert opening 14. The cavity 13 enables the user to view a portion of the insert plate 18 positioned within the insert opening 14.

Referencing FIGS. 4-9, the insert opening 14 is a passage that traverses the housing 12 and the rounded section 15 enabling a coincident engagement with the insert plate 18. The insert opening 14 is found operatively aligned with the guide openings 6 of the plurality of guide loops 5. The operative alignment between the guide openings 6 and the insert opening 14 enables the passage of the insert plate 18 into the housing 12 in order to become operatively coupled with the at least two insert mounts 17. The insert opening 14 traverses through the rounded section. The traversal of the insert opening 14 through the rounded section 15 forms an opening that is relatively smaller than the insert plate 18. The insert opening 14 is coincident with the at least two insert mounts 17. The coincident positioning of the insert opening 14 with the at least two insert mounts 17 permits the operative engagement of the insert plate 18 with the insert coupler 11.

Referencing FIGS. 1-4 and FIGS. 6-9, the rounded section 15 is the portion of the insert coupler 11 positioned immediately adjacent to the housing 12. The rounded section 15 is positioned opposite the positioning of the elongated body 10 across the housing 12, wherein the rounded section 15 contains an apex on its curvature that is furthest point of the rounded section 15 from the elongated body 10. The curvatures of the rounded section 15 are found within the rounded section, wherein the interior curvatures 16 bias towards the apex of the rounded section. The insert opening 14 traverses through the rounded section, wherein the apex of the rounded section 15 is traversed by the insert opening 14. The at least two insert mount 17 are found coincident with the insert opening 14 and the rounded section. The interior curvature 16 of the rounded section 15 is provided as a means of funneling the insert plate 18 into alignment with at least two insert mounts 17.

Referencing FIGS. 4-9, the at least two insert mounts 17 are provided as structural elements that enable the detachable coupling of the insert plate 18 to the insert coupler 11. The at least two insert mounts 17 are positioned coincident with the rounded section 15 and the insert opening 14. The coincident positioning with the insert opening 14 ensures the insert plate 18 aligns with the at least two insert mounts 17. The coincident positioning with the rounded sections ensure that the insert plate 18 operatively engages the at least two insert mounts 17 by guiding the insert plate 18 towards the at least two insert mounts 17. The at least two insert mounts 17 are structural features that elastically retain the insert plate 18 within the insert coupler 11. Each of the at least two insert mounts 17 are positioned opposite the insert opening 14 on the rounded section. The at least two insert mount 17 laterally engage the insert plate 18 elastically retaining it in place.

Referencing FIGS. 1-4 and FIGS. 6-9, the insert plate 18 is the elongated structure that provides an engagement between the extended strap 27 and the harness plate 9. The insert plate 18 is detachably engaged to the extended strap 27. The insert plate 18 is the intermediary between the harness plate 9 and the extended strap 27. The insert plate 18 is a detachably engaged component positioned parallel to the elongated body 10 of the harness plate 9. The insert plate 18 traverses through the guide openings 6 of the plurality of guide loops 5 becoming coincident with the insert coupler 11. The guide opening 6 of the plurality of guide loops 5 are operatively aligned with the insert coupler 11 permitting the coincident engagement with the insert plate 18. The insert plate 18 traverses through the guide openings 6 of the plurality of guide loops 5 on top of the upper surface 3. The insert plate 18 traverses into the housing 12 by way insert opening 14. The insert plate 18 becomes coincident with the rounded section 15 and the at least two insert mounts 17 securing the insert plate 18 with the insert coupler 11. In the current embodiment of the present invention, the insert plate 18 comprises an attachment port 19 and at least two prongs 21. The attachment port 19 functions as the engagement point between the insert plate 18 and the extended strap 27. The attachment port 19 is found positioned opposite the at least two prongs 21 along the length of the insert plate 18. The at least two prongs 21 are the engageable features of the insert plate 18 with the insert coupler 11.

Referencing FIGS. 1-4 and FIG. 10, the attachment port 19 is an engageable feature of the insert plate 18 that permits the detachable engagement between the insert plate 18 and the extended strap 27. The attachment port 19 traverses the insert plate 18. The traversal of the attachment port 19 through the insert plate 18 is perpendicular to the positioning of the upper surface 3 and the lower surface 4. The attachment port 19 is positioned adjacent to the first adjustment strap relative to the at least two prongs 21. The attachment port 19 is positioned opposite the at least two prongs 21 along the length of the insert plate 18. The attachment port 19 is found positioned outside of the plurality of guide loops 5. In the current embodiment of the present invention the attachment port 19 comprises a reinforced ring 20. The reinforced ring 20 is a support element that prevents deformation of the attachment port 19 by repeated pulls from the extended strap 27. The reinforced ring 20 is concentrically mounted to the attachment port 19, wherein the positioning of the reinforced ring 20 is permitrically positioned to the attachment port 19.

Referencing FIGS. 1-4 and FIGS. 6-9, the at least two prongs 21 are the engagement features that join the insert plate 18 to the at least two insert mounts 17 of the insert coupler 11. The at least two prong are a pair of spaced protrusion that extend from the insert plate 18 opposite the positioning of the attachment port 19. The at least two prongs 21 traverse the guide openings 6 of the plurality of guide loops 5. The at least two prongs 21 traverse into the housing 12 of the insert coupler 11 by way of the coincident alignment with the insert opening 14. The at least two prongs 21 traverse through the insert opening 14 and partially traverse the rounded section. The at least two prongs 21 are elastically retained by the at least two insert mounts 17. The at least two insert mounts 17 laterally engage the at least two prongs 21. In the current embodiment of the present invention, each prong 21 of the at least two prongs 21 comprise a rounded end 22 and a recessed mount 23. The rounded end 22 is the rounded terminus of the at least two prongs 21 that facilitates the engagement with the at least two insert mounts 17. The recessed mounts 23 are laterally positioned engagement points that become coincident with the at least two insert mounts 17.

Referencing FIGS. 6-9, the rounded end 22 is a terminally positioned feature found on each prong 21 of the at least two prongs 21. The rounded end 22 is the portion of the at least two prongs 21 that traverses the rounded section. The rounded end 22 function complimentarily with the interior curvatures 16 of the rounded section 15 in order to guide each of the at least two prongs 21 through the insert opening 14 facilitating engagement with the at least two insert mounts 17. The at least two insert mounts 17 are positioned coincident with the insert opening 14 through the rounded section. The at least two insert mounts 17 decrease the size of the insert opening 14 through the rounded section. Through the use of the rounded end 22, the interior curvature 16 of the rounded section, and the insert opening 14 traversing through the apex of rounded section, the at least two prongs 21 are directed through the insert opening 14 enabling the coincident engagement of the recessed mounts 23 with the at least two insert mounts 17.

Referencing FIGS. 6-9, the recessed mounts 23 are structural features that coincidently engage the at least two insert mounts 17 of the insert coupler 11. The recessed mounts 23 are positioned laterally on the at least two prongs 21, wherein the recessed mount 23 are symmetrically positioned to the at least two prongs 21. The positioning of the recessed mount 23 relative to the at least two prongs 21 ensure a coincident engagement with the at least two insert mounts 17. The recessed mounts 23 are incised sections of the at least two prongs 21 that enable a coincident engagement with the at least two insert mounts 17 due to their positioning decreasing size of the insert opening 14 through the rounded section. The recessed mount 23 of each prong 21 of the at least two prong becomes coincident with an insert mount 17 of the at least two insert mounts 17 following the traversal of the rounded end 22 through the rounded section. In the current embodiment of the present invention, the recessed mount 23 comprises beveled edges. The beveled edges are sloping sides biased towards the interior of the recessed mount 23. the beveled edges facilitate the engagement of each insert mount 17 of the at least two insert mounts 17 with the recessed mount 23 by guiding each insert mount 17 into the interior of the recessed mount 23 as the rounded ends 22 traverse through the rounded section.

Referencing FIGS. 1-4 and FIGS. 6-9, in an embodiment of the present invention the at least two prongs 21 comprise a first prong 24 and a second prong 25 separated by a voided space 26. The first prong 24 and the second prong 25 are positioned parallel to one another extending away from the insert plate 18. Both the first prong 24 and the second prong 25 each comprise a rounded end 22 and a recessed mount 23. The recessed mount 23 of the first prong 24 is found positioned opposite the voided space 26. Similarly, due to the symmetrical arrangement, the recessed mount 23 of the second prong 25 is found positioned opposite the voided space 26. The first prong 24 and the second prong 25 are flexibly positioned to the voided space 26. The flexible positioning of the first prong 24 and the second prong 25 to the voided space 26 enables the first prong 24 and the second prong 25 to be compressible while the rounded ends 22 traverse through the rounded section. The first prong 24 and the second prong 25 flex towards the voided space 26 as the rounded ends 22 are funneled through the insert opening 14 by the interior curvatures 16 of the rounded section. The beveled edges of the recessed mounts 23 facilitate the engagement between the at least two insert mounts 17 and the interior of the recessed mount 23 as the rounded ends 22 traverse through the rounded section.

Referencing FIG. 1 and FIG. 10, the extended strap 27 is an intermediary component that joins secondary restraint assembly to a leash 30. The extended strap 27 facilitates the engagement with the leash 30 as the extended strap 27 is provided with sufficient length to unobtrusively engage a handle of the leash 30 while it is also manipulated by a user. It should be noted that a user is not require to manipulate the handle of the leash 30 while it is coupled to the extended strap 27. The extended strap 27 is flexibly and rotatably coupled between the leash 30 and the insert plate 18 in order to allow freedom of movement for the user. In the current embodiment of the present invention, the extended strap 27 comprises a first coupler 28 and a second coupler 29. The first coupler 28 is provided as the detachable engagement mechanism coincident with the attachment port 19. The second coupler 29 is provided as the detachably engagement mechanism that is attached to the handle of the leash 30.

Referencing FIG. 1 and FIG. 10, the first coupler 28 and the second coupler 29 are positioned opposite the length of the extended strap 27. The distance between the first coupler 28 and the second coupler 29 is provided as being sufficient in length in order to unobtrusively permit engagement of the second coupler 29 with the handle of a leash 30. The first coupler 28 detachably engages the attachment port 19 and applies a pull force to the reinforced ring 20 when the extended strap 27 experiences a tug or pull from the leash 30.

In an embodiment of the invention the first adjustable strap 7 and the second adjustable strap 8 are integrally coupled with a forearm sleeve coupled to a glove. The invention configured with a forearm sleeve and glove would allow a user in colder climates to attach the secondary restraint assembly and retain warmth by not exposing their forearm to the environment. In the aforementioned embodiment the forearm sleeve provides specific engagements to thread both the first adjustable strap 7 and the second adjustable strap 8 in order to secure the secondary restraint assembly to the user's forearm while maintaining it covered.

In an embodiment of the invention the second adjustable strap 8 is operatively coupled with the insert plate 18, wherein a tug experienced by the insert plate 18 would result in the tightening of the second adjustable strap 8. The aforementioned configuration would permit the second adjustable strap 8 to secure around the upper forearm when the insert plate 18 is tugged resulting in a more secure engagement for the secondary restraint assembly to the user. Alternatively the second adjustable strap 8 could be operatively coupled to extended strap 27 or the insert plate 18 as both components could be used to transfer the pull force to tighten the second adjustable strap 8 around the user's upper forearm.

The invention is a pet leash safety apparatus comprising a harness assembly, an insert plate, and an extended strap. The harness assembly is intended to be attached to a user's forearm. The harness assembly serves as a base for the invention, securing the invention to the user and ensuring that any load the invention is subjected to is safely transferred to the user's body such that the user's muscles are able to bear the load as opposed to their joints. Human arm joints are not intended to directly bear tensile forces which could separate the joints or sprain them, injuring the user. The harness assembly helps to prevent this from happening by attaching the invention directly to the user's forearm. It should be noted that the harness plate and the sleeve are hereinafter described in combination as a plate assembly. Furthermore it should be noted that the first adjustable strap and the second adjustable strap are hereinafter described in combination as adjustable forearm straps. The harness assembly comprises a plate assembly and adjustable forearm straps. The purpose of the plate assembly is to attach the harness assembly to the other components of the invention which subsequently attach to the leash.

The plate assembly allows the harness assembly to hold the insert plate. The plate assembly comprises a main length, a plurality of alignment loops, and a plate coupler. The main length, is a rectangular strip of material with a thickness much smaller than that of its width. The main length serves as the base or frame for the harness assembly with the other components of the harness assembly being attached to the main length. The main length may be comprised of either a flexible or a rigid material. If comprised of a flexible material, the invention may be more comfortable for the user, however the present invention may not be as robust as would be if the main length were made of a rigid material. The main length may be comprised of a rigid material since the main length is flush with the user's forearm when the present invention is worn and does not obstruct the articulation of the user in any way. The plurality of alignment loops are arranged evenly along the top of the main length. Each of the plurality of main loops comprises a small loop that is attached to the main length, allowing an object to pass through the loop. The purpose of the plurality of alignment loops is to ensure that the insert plate is held close to the main length, thus maintaining good control and load distribution when the invention is subjected to a force loading.

The plurality of alignment loops alone are not sufficient to keep the insert plate attached to the plate assembly when the invention is subjected to loads. The plate coupler is attached to the end of the insert plate and prevents the insert plate from being separated from the plate assembly unless desired by the user. The combination of the quick release buckle and the plurality of alignment loops keeps the insert plate attached to the plate assembly and properly aligned to distribute forces to the user's forearm. The plate coupler is attached to the rear end of the main length. In an embodiment of the invention, the plate coupler can be a standard cam type buckle. Cam buckles operate on friction, applying a normal force on the insert plate and thereby preventing the insert plate from leaving the strap holder. The insert plate can be released from the plate assembly by simply depressing the quick release buckle. Although an embodiment of the invention utilizes a cam buckle type as the plate coupler, there are other methods which could be used to equal effect. For example, a crank type buckle as are commonly used in tie down cargo straps could be utilized. This type of buckle is much more resistant to impulses which cam buckle types can sometimes be vulnerable too. Unfortunately, the crank type buckles are typically heavier and take up more space than cam type buckles. Additionally, crank type buckles utilize far more components which adds to the bulk and weight of the device as well as making it aesthetically unappealing. Nevertheless, the crank type buckle can still be utilized in the invention and may be beneficial for use with larger breeds of dogs.

The plate assembly is held on the user's forearm through the use of adjustable forearm straps. The invention may have as few as one adjustable forearm strap, however if there is only one adjustable forearm strap, that adjustable forearm strap must be located near the plate coupler to ensure that forces are properly distributed into the user's arm. Each adjustable forearm strap is attached to the main length of the strap holder and comprises a partial loop of material. The partial loop may be comprised of any flexible and strong material including but not limited to nylon webbing or leather. The two ends of each adjustable forearm strap can be connected together and tightened via a tightening buckle. The use of the tightening buckle is one option utilized by the invention however other methods could be used such as hook and loop fasteners and side release buckles. Any method may be used, so long as the adjustable forearm straps can be closed and tightened around the user's forearm, thus securing the invention to the user.

the insert plate comprises a length of material and an eyelet. The length of material has a width much greater than that of the thickness. The length of material must be of appropriate dimensions such that the insert plate fits through the plurality of alignment loops. The insert plate further comprises the eyelet. The eyelet is located at the front end of the insert plate. The eyelet comprises a small metal ring which is embedded into the length of material. The purpose of the eyelet is to allow the extended strap to attach to the insert plate without causing the material of the insert plate to fray or tear.

The extended strap is in place to connect the invention to the leash. The extended strap comprises a length of material and a clip at each end. The extended strap is very similar to a regular leash however the extended strap is much shorter and comprises a clip at each end as opposed to a clip at one end and a handle at the other end. By having a clip at each end of the extended strap, the extended strap is able to attach to both the insert plate and the leash. The purpose of the extended strap is to allow the user of the invention to still hold the leash normally as there is enough slack in the extended strap. Thus, the leash is carried normally by the user, but is still secured to the invention which is secured to the user, preventing the user form losing control of the leash unless the insert plate is detached from the plate coupler separating the insert plate from the plate assembly. The length of the extended strap may vary depending on how much slack is desired by the user. Also, it is important to note that the extended strap should be flexible and may be manufactured out of materials including but not limited to cloth, nylon webbing, and leather.

It is contemplated that an additional optional component of the invention may exist which allows the user to vary the position where the extended strap attaches to the leash as opposed to simply attaching to the handle. This optional component is a leash anchor comprising a top plate, a bottom plate, an eyelet, and a fastener. The top plate and the bottom plate both have at least one hole drilled through them to allow the fastener to be threaded through both components. The eyelet is attached to the top plate and provides a point to which one of the clips of the extended strap may be attached. The top plate and the bottom plate are slid into place over the leash and the fastener is tightened, sandwiching the leash in between the top and the bottom plate, thus securing the leash anchor to the leash. The purpose of this is to allow the user to decide the amount of slack between the leash and the invention. More slack may result in increased comfort but may also result in a higher amount of force on the invention as the animal has had more time to accelerate before the invention catches the leash.

It is also contemplated that an alternative embodiment of the invention exists in which a glove is attached to the strap holder. The glove may be in addition to the adjustable forearm straps or may serve as an alternative method to attach the strap holder to the user's forearm. The glove may cover much of the user's forearm and possibly part of the users hand for increased stability of the invention. The glove may make the invention more comfortable for the user, and may also make it easier to put on the invention. Ease of use of the invention is very important, as walking the dog is part of many dog owner's daily routines.

Although the invention has been explained in relation to its preferred embodiment, it is to be understood that many other possible modifications and variations can be made without departing from the spirit and scope of the invention as hereinafter claimed.

What it claimed is:

1. A secondary restraint assembly comprises:
a harness assembly;
a harness plate;
an insert plate;
an extended strap;
the harness assembly comprises a sleeve, an upper surface, a lower surface, a plurality of guide loops, a first adjustable strap, and a second adjustable strap;
the harness plate comprises an elongated body and an insert coupler;
the insert plate comprises an attachment port and at least two prongs;
the extended strap comprises a first coupler and a second coupler;
each of the plurality of guide loops comprises a guide opening;
the insert coupler comprises a housing, a cavity, an insert opening, a rounded section, and at least two insert mounts;
the at least two prongs each comprise a rounded end and a recessed mount;
the sleeve being positioned between the upper surface and the lower surface;
the plurality of guide loops being secureably and operatively coupled to the upper surface, wherein each guide opening of the plurality of guide loops being positioned in alignment to one another;
the first adjustable strap and the second adjustable strap being secureably positioned on the lower surface, wherein the first adjustable strap being positioned apart from the second adjustable strap along the lower surface;
the harness plate being detachably coupled to the harness assembly, wherein the sleeve being traversed by the elongated body;
the insert coupler being positioned adjacent to the second adjustment strap;
the guide openings of the plurality of guide loops being operatively aligned with the insert opening;
the insert opening traverses through the housing and the rounded section;
the cavity traverses the housing into the insert opening;
the rounded section being positioned distal to the second adjustment strap across the housing;
the at least two insert mounts being coincident with the rounded housing and the insert opening;
the plurality of guide loops being traversed by the insert plate, wherein the guide openings of the plurality of guide loops being traversed by the at least two prongs;
the rounded end of the at least two prongs traverse the rounded section;
the recessed mount of each of the at least two prongs being elastically secured to the at least two insert mounts;
the attachment port being positioned opposite the at least two prongs along the insert plate;
the attachment port traverses the insert plate;
the attachment port being positioned adjacent to the first adjustment strap;
the extended strap being detachably coupled to the insert plate by way of the attachment port;
the first coupler being positioned opposite the second coupler across the extended strap; and
the first coupler being detachably engaged to the attachment port.

2. The secondary restraint assembly as claimed in claim 1 comprises:
the second adjustable strap being longer than the first adjustable strap, wherein the second adjustable strap being provided with sufficient length to be secured around a user's upper forearm.

3. The secondary restraint assembly as claimed in claim 1 comprises:
the at least two prongs comprise a first prong and a second prong separated by a voided space; and
the first prong and the second prong being flexibly positioned to the voided space, wherein the first prong and the second prong being compressible towards the voided space.

4. The secondary restraint assembly as claimed in claim 1 comprises:
the recessed mount comprises beveled edges, wherein the beveled edges being biased towards the interior of the recessed mount.

5. The secondary restraint assembly as claimed in claim 1 comprises:
the attachment port comprises a reinforced ring; and
the reinforced ring being concentrically mounted to the attachment port.

6. A secondary restraint assembly comprises:
a harness assembly;
a harness plate;
an insert plate;
an extended strap;
the harness assembly comprises a sleeve, an upper surface, a lower surface, a plurality of guide loops, a first adjustable strap, and a second adjustable strap;
the harness plate comprises an elongated body and an insert coupler;
the insert plate comprises an attachment port and at least two prongs;
the extended strap comprises a first coupler and a second coupler;
each of the plurality of guide loops comprises a guide opening;
the insert coupler comprises a housing, a cavity, an insert opening, a rounded section, and at least two insert mounts;
the at least two prongs each comprise a rounded end and a recessed mount;
the at least two prongs comprise a first prong and a second prong separated by a voided space;
the attachment port comprises a reinforced ring;
the sleeve being positioned between the upper surface and the lower surface;
the plurality of guide loops being secureably and operatively coupled to the upper surface, wherein each guide opening of the plurality of guide loops being positioned in alignment to one another;
the first adjustable strap and the second adjustable strap being secureably positioned on the lower surface, wherein the first adjustable strap being positioned apart from the second adjustable strap along the lower surface;
the harness plate being detachably coupled to the harness assembly, wherein the sleeve being traversed by the elongated body;
the insert coupler being positioned adjacent to the second adjustment strap;
the guide openings of the plurality of guide loops being operatively aligned with the insert opening;
the insert opening traverses through the housing and the rounded section;
the cavity traverses the housing into the insert opening;
the rounded section being positioned distal to the second adjustment strap across the housing;
the at least two insert mounts being coincident with the rounded housing and the insert opening;
the plurality of guide loops being traversed by the insert plate, wherein the guide openings of the plurality of guide loops being traversed by the at least two prongs;
the rounded end of the at least two prongs traverse the rounded section;
the first prong and the second prong being flexibly positioned to the voided space, wherein the first prong and the second prong being compressible towards the voided space;
the recessed mount of each of the at least two prongs being elastically secured to the at least two insert mounts;
the attachment port being positioned opposite the at least two prongs along the insert plate;
the attachment port traverses the insert plate;
the reinforced ring being concentrically mounted to the attachment port;
the attachment port being positioned adjacent to the first adjustment strap;
the extended strap being detachably coupled to the insert plate by way of the attachment port;
the first coupler being positioned opposite the second coupler across the extended strap; and
the first coupler being detachably engaged to the attachment port.

7. The secondary restraint assembly as claimed in claim 6 comprises:
the second adjustable strap being longer than the first adjustable strap, wherein the second adjustable strap being provided with sufficient length to be secured around a user's upper forearm.

8. The secondary restraint assembly as claimed in claim 6 comprises:
the recessed mount comprises beveled edges, wherein the beveled edges being biased towards the interior of the recessed mount.

9. A secondary restraint assembly comprises:
a harness assembly;
a harness plate;
an insert plate;
an extended strap;
the harness assembly comprises a sleeve, an upper surface, a lower surface, a plurality of guide loops, a first adjustable strap, and a second adjustable strap;
the harness plate comprises an elongated body and an insert coupler;
the insert plate comprises an attachment port and at least two prongs;
the extended strap comprises a first coupler and a second coupler;
each of the plurality of guide loops comprises a guide opening;
the insert coupler comprises a housing, a cavity, an insert opening, a rounded section, and at least two insert mounts;
the at least two prongs each comprise a rounded end and a recessed mount;
the at least two prongs comprise a first prong and a second prong separated by a voided space;
the attachment port comprises a reinforced ring;
the recessed mount comprises beveled edges;
the sleeve being positioned between the upper surface and the lower surface;
the plurality of guide loops being secureably and operatively coupled to the upper surface, wherein each guide opening of the plurality of guide loops being positioned in alignment to one another;
the first adjustable strap and the second adjustable strap being secureably positioned on the lower surface, wherein the first adjustable strap being positioned apart from the second adjustable strap along the lower surface;
the second adjustable strap being longer than the first adjustable strap, wherein the second adjustable strap being provided with sufficient length to be secured around a user's upper forearm;
the harness plate being detachably coupled to the harness assembly, wherein the sleeve being traversed by the elongated body;
the insert coupler being positioned adjacent to the second adjustment strap;
the guide openings of the plurality of guide loops being operatively aligned with the insert opening;
the insert opening traverses through the housing and the rounded section;
the cavity traverses the housing into the insert opening;

the rounded section being positioned distal to the second adjustment strap across the housing;

the at least two insert mounts being coincident with the rounded housing and the insert opening;

the plurality of guide loops being traversed by the insert plate, wherein the guide openings of the plurality of guide loops being traversed by the at least two prongs;

the rounded end of the at least two prongs traverse the rounded section;

the first prong and the second prong being flexibly positioned to the voided space, wherein the first prong and the second prong being compressible towards the voided space;

the beveled edges being biased towards the interior of the recessed mount;

the recessed mount of each of the at least two prongs being elastically secured to the at least two insert mounts;

the attachment port being positioned opposite the at least two prongs along the insert plate;

the attachment port traverses the insert plate;

the reinforced ring being concentrically mounted to the attachment port;

the attachment port being positioned adjacent to the first adjustment strap;

the extended strap being detachably coupled to the insert plate by way of the attachment port;

the first coupler being positioned opposite the second coupler across the extended strap; and the first coupler being detachably engaged to the attachment port.

* * * * *